(12) United States Patent
Wu et al.

(10) Patent No.: US 8,817,414 B1
(45) Date of Patent: Aug. 26, 2014

(54) DATA DETECTOR FOR DETECTING DATA IN PRESENCE OF CONTROL SIGNALS

(71) Applicant: Marvell International Ltd., Hamilton (BM)

(72) Inventors: Zining Wu, Los Altos, CA (US); Pantas Sutardja, Los Gatos, CA (US)

(73) Assignee: Marvell International Ltd. (BM)

( * ) Notice: Subject to any disclaimer, the term of this patent is extended or adjusted under 35 U.S.C. 154(b) by 28 days.

(21) Appl. No.: 13/624,054

(22) Filed: Sep. 21, 2012

Related U.S. Application Data

(60) Provisional application No. 61/540,138, filed on Sep. 28, 2011.

(51) Int. Cl.
*G11B 5/09* (2006.01)
*G11B 20/10* (2006.01)
*G11B 5/596* (2006.01)

(52) U.S. Cl.
USPC ......................................... 360/77.11; 360/39

(58) Field of Classification Search
CPC ...................................................... G11B 5/5965
See application file for complete search history.

(56) References Cited

U.S. PATENT DOCUMENTS 4,286,296 A * 8/1981 Cunningham ............. 360/77.11
6,873,482 B1 * 3/2005 Hsieh et al. ..................... 360/48

* cited by examiner

*Primary Examiner* — Daniell L Negron (57) ABSTRACT

Systems, methods, and other embodiments associated with a data detector that processes signals read from a storage device are described. According to one embodiment, a detector for detecting a data signal embedded in a read signal from a storage device includes a signal estimator configured to generate an estimate of the control signal from the read signal by sampling the read signal to determine characteristics of the control signal. The read signal includes the data signal and the control signal. The signal estimator uses the characteristics to calculate the estimate of the control signal. The detector also includes a cancellation unit configured to produce the data signal by cancelling the estimate of the control signal from the read signal.

17 Claims, 6 Drawing Sheets

Read Signal 110

Data Signal 120

DATA DETECTOR FOR DETECTING DATA IN PRESENCE OF CONTROL SIGNALS

CROSS REFERENCE TO RELATED APPLICATIONS

This patent disclosure claims the benefit of U.S. Provisional Application No. 61/540,138 filed on Sep. 28, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Many data storage devices use detectors to reproduce data from a read signal when reading a storage medium. The detector reproduces the data by, for example, detecting the data in the read signal and converting the data from an analog signal into a binary format. However, detecting the data can be complicated by the presence of noise in the read signal. For example, the read signal can include the stored data and embedded control signals. Control signals are sometimes stored with the data to provide information about data locations in a storage medium. A data storage device uses the location information during read and write operations to ensure data is being read from a correct location in the storage medium.

However, when the control signal is present in the read signal, difficulties with decoding the data occur. Decoding difficulties occur because of interference from the control signal with detection of data and an increased signal-to-noise ratio (SNR) requirement of the detector. Thus, a higher bit error rate (BER) is present from the interference, which leads to the difficulties in decoding the read signal.

SUMMARY

In one embodiment, a detector for detecting a data signal embedded in a read signal from a storage device includes a signal estimator configured to generate an estimate of the control signal from the read signal by sampling the read signal to determine characteristics of the control signal. The read signal includes the data signal and the control signal. The signal estimator uses the characteristics to calculate the estimate of the control signal. The detector also includes a cancellation unit configured to produce the data signal by cancelling the estimate of the control signal from the read signal.

In another embodiment, the control signal is a continuous servo signal that is embedded with the data signal. The continuous servo signal guides the storage device when reading data from a storage medium of the storage device.

In another embodiment, the characteristics of the control signal include a phase and an amplitude. The cancellation unit is configured to cancel the estimate of the control signal from the read signal by combining an inverse of the estimate of the control signal with the read signal.

In another embodiment, the signal estimator is configured to remove the data signal from the read signal by using a filter and to use a remainder of the read signal to generate the estimate of the control signal.

In another embodiment, the read signal is a sinusoidal waveform. The signal estimator includes a filter that isolates a frequency band of the control signal to remove noise from the data signal of the read signal when generating the estimate of the control signal.

In one embodiment, a method for detecting a data signal embedded in a read signal of a storage device includes generating, in a hardware detector configured to perform the method, an estimate of a control signal from the read signal by sampling the read signal to determine characteristics of the control signal. The read signal includes the data signal and the control signal. Generating the estimate includes calculating the estimate using the characteristics. The method also includes producing the data signal by cancelling the estimate of the control signal from the read signal.

In another embodiment, the control signal is a continuous servo signal that is embedded with the data signal. The continuous servo signal guides the storage device when reading data from a storage medium of the storage device.

In another embodiment, the characteristics of the control signal include a phase and an amplitude. Cancelling the estimate of the control signal from the read signal includes subtracting the estimate of the control signal from the read signal.

In another embodiment, the method also includes filtering the read signal to isolate a frequency band of the control signal from the read signal. Filtering the read signal removes portions of the data signal from the read signal that have a different frequency than the control signal.

In another embodiment, generating the estimate of the control signal includes using a filter to remove portions of the data signal from the read signal and using a remainder of the read signal to generate the estimate of the control signal.

In one embodiment, a data detector for detecting a data signal embedded in a read signal that is produced by a storage device includes a signal estimator configured to determine characteristics of a servo signal from the read signal and to generate an estimate of the servo signal using the characteristics. The read signal includes the data signal and the servo signal. The data detector also includes a cancellation unit configured to output the data signal by applying the estimate of the servo signal to the read signal to cancel the servo signal from the read signal.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with a data detector that processes signals read from a storage device. In one embodiment, the signals include both data signals and embedded control signals, and the data detector is configured to reproduce or extract the data signals with a minimal amount of control signals remaining. In one embodiment, the data detector is configured to estimate the control signal from a read signal received from the storage device. The data detector uses the estimate of the control signal to cancel the actual control signal from the read signal leaving the data signal, which now has a reduced amount of interference from the control signal. With a lower amount of signals to process since some or all of the control signals are cancelled, the data signals can then be decoded at a lower error rate.

Figure 1:
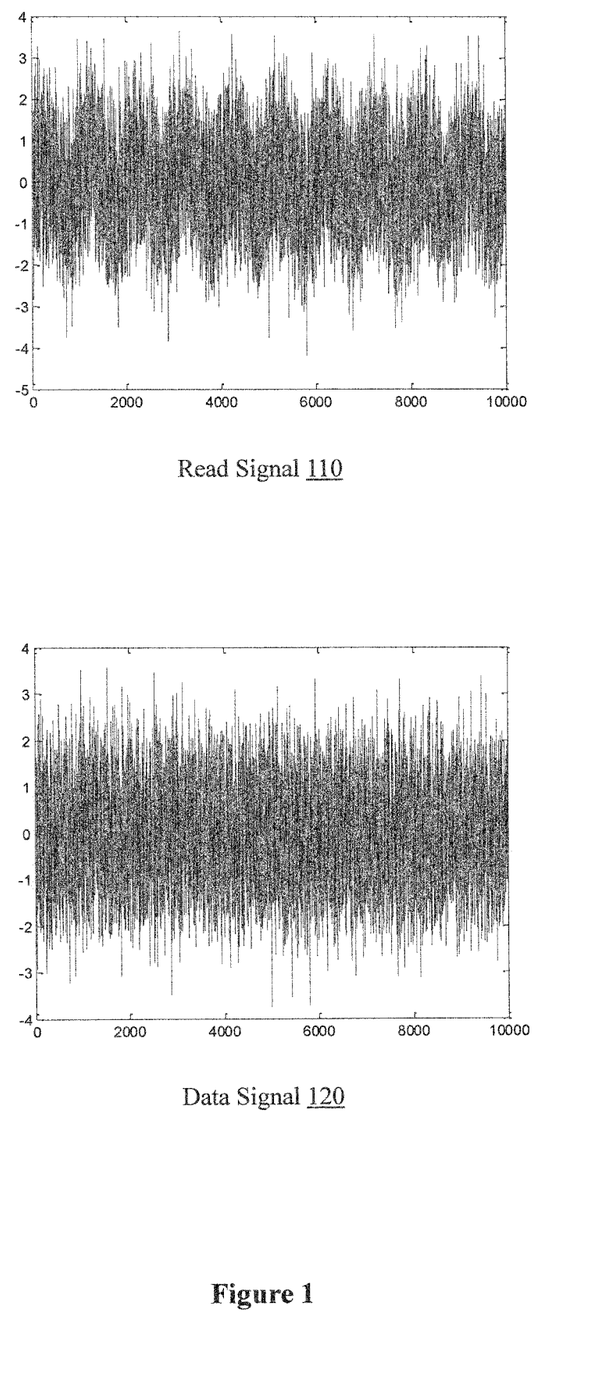
FIG. 1 illustrates one example of a data signal and a read signal.

Consider FIG. 1, which illustrates an example of a read signal 110 and a comparison example of a data signal 120. The read signal 110 is produced by a storage device (e.g., storage device 230 of FIG. 2) when reading data from a storage medium (e.g., storage medium 240 of FIG. 2) of the storage device. The storage medium in the storage device includes a section with data and a section with control information (e.g., control signals). The sections can be arranged in multiple layers with one layer on top of the other or the sections can be arranged side-by-side. In either case, when the storage device reads the storage medium the sections are read in tandem, which produces the read signal 110 that includes not only data like the data signal 120 but also embedded control signals (e.g., the read signal 110 is a superposition of a control signal and the data signal 120). The embedded control signal, for example, is a low frequency (compared to the data signal 120) sinusoidal signal. The control signal may also be a combination of two sinusoidal signals with different frequencies and phases.

If the data detector uses the read signal 110 as an input to a data decoder, the resulting data would include a high rate of errors. As seen in FIG. 1, the read signal 110 differs from the actual data signal 120 because of interference caused by the control signal in the read signal 110. The high rate of errors in the data detector results from the control signal interfering with detection of data indicated in the read signal 110. Accordingly, the data detector described herein is configured to extract the data signal 120 from the read signal 110 by applying an estimate of the control signal to the read signal 110, to cancel the control signal and produce the data signal 120. The data signal 120 is then provided to a data decoder to produce data with fewer errors because of a reduced amount of noise in the data signal 120 compared with the read signal 110.

It is noted that cancelling the control signal is not intended to imply that the control signal is completely eliminated or removed from the read signal every time. The control signal may be partially removed during a cancellation process.

Figure 2:
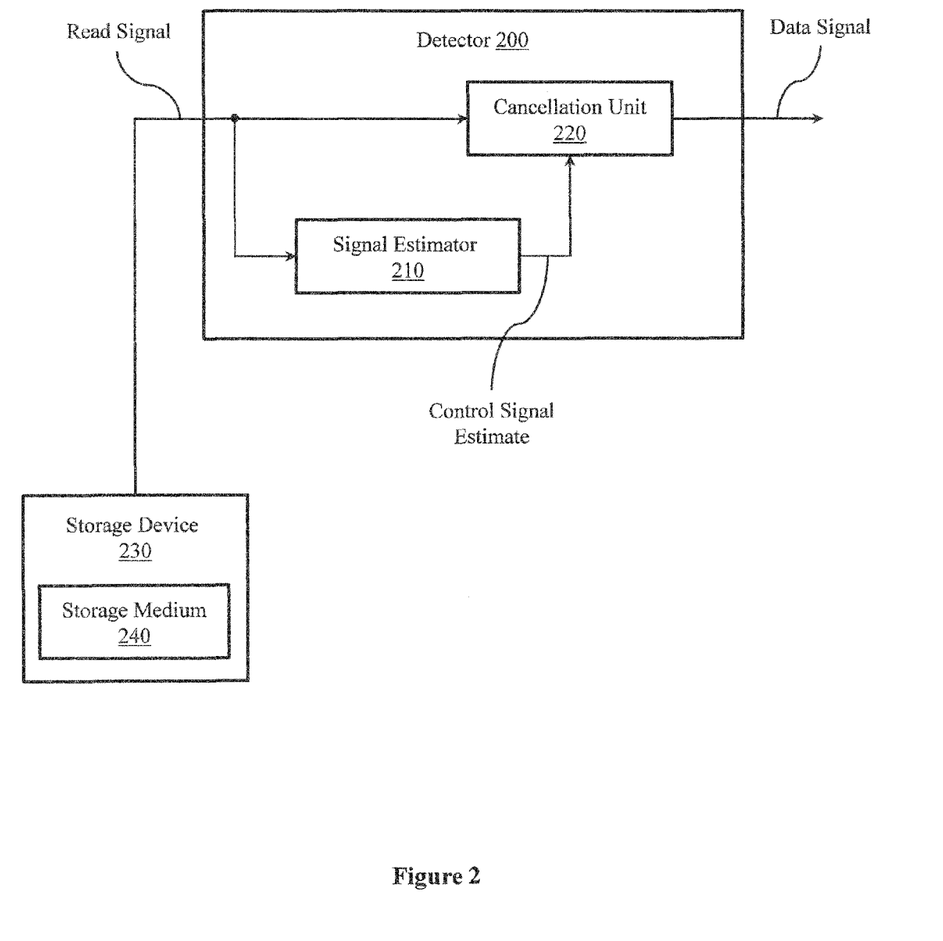
FIG. 2 illustrates one embodiment of a detector that is associated with producing a data signal that is embedded with a control signal.

With reference to FIG. 2, one embodiment of a detector 200 is shown that is associated with producing a data signal that is embedded with a control signal. The detector 200 includes a signal estimator 210 and a cancellation unit 220. The detector 200 is, for example, a hardware device (e.g., an integrated circuit) that is integrated within or is in communication with a storage device 230. The storage device is, for example, a hard disk drive (HDD), a magnetic tape drive, or other storage device that produces a combined data and control signal when reading data from a storage medium 240. The storage medium 240 may be a magnetic medium, an optical medium, electronic medium, and so on.

The signal estimator 210 receives a read signal (e.g., read signal 110) that needs to be decoded from the storage device 230. The signal estimator 210 is configured to generate an estimate signal that corresponds to the control signal embedded in the read signal. The control signal is, for example, a continuous servo signal that guides the storage device 230 by providing a location of data in the storage medium 240. When the storage device 230 reads the storage medium 240, the location in the storage medium 240 is read in tandem with the data. This results in the read signal including the control signal (e.g., location information) and the data signal.

To estimate the control signal, the signal estimator 210 samples the read signal to determine characteristics of the control signal. Sampling the read signal includes determining a current value (e.g., a voltage level) of the read signal. The signal estimator 210 samples the read signal at a predetermined frequency. In general, the predetermined frequency is twice a fundamental frequency of the control signal. However, depending on sampling requirements of the detector 200, the predetermined frequency can be higher than twice the fundamental frequency of the control signal when, for example, a higher degree of accuracy is desired.

From sample values, the signal estimator 210 determines the characteristics of the control signal and then estimates the control signal. The characteristics include an amplitude (A) of the control signal and a phase (θ) of the control signal. Because the control signal is a sinusoidal waveform, the control signal can be represented by equation (1), as follows:

$$s(k) = A \sin(2\pi f_s kT + \theta) \quad (1)$$

A is the amplitude of the control signal.
θ is the phase of the control signal.
$f_s$ is a fundamental frequency of the control signal.
k is a sample value of the read signal.
T is a sampling frequency of the control signal. As previously described, the sampling frequency is twice the fundamental frequency ($f_s$) or higher (e.g., four times the fundamental frequency), in one embodiment. Thus, T can be represented as $\frac{1}{4}f_s$ when the sampling frequency is four times the fundamental frequency. Substituting $\frac{1}{4}f_s$ for T in equation (1) results in equation (2), which follows.

$$s(k) = A \sin\left(\frac{\pi}{2}k + \theta\right) \quad (2)$$

When the sampling frequency of the read signal is four times the fundamental frequency, the signal estimator 210 produces an estimate of the control signal using equation (2) using estimated values of the amplitude and the phase determined from the read signal. An output of the signal estimator 210 is connected to the cancellation unit 220 to provide the estimate of the control signal to the cancellation unit 220. The cancellation unit 220 also receives the read signal from the storage device. In one embodiment, the cancellation unit 220 is configured to produce the data signal by subtracting the estimate of the control signal from the read signal.

The cancellation unit 220 can also remove the control signal from the read signal by, for example, applying an inverse of the estimate of the control signal to the read signal in order to extract the data signal. An output of the cancellation unit 220 provides the data signal to, for example, a data decoder, which decodes the data signal to produce data in a binary format that can then be sent to a host computer.

Figure 3:
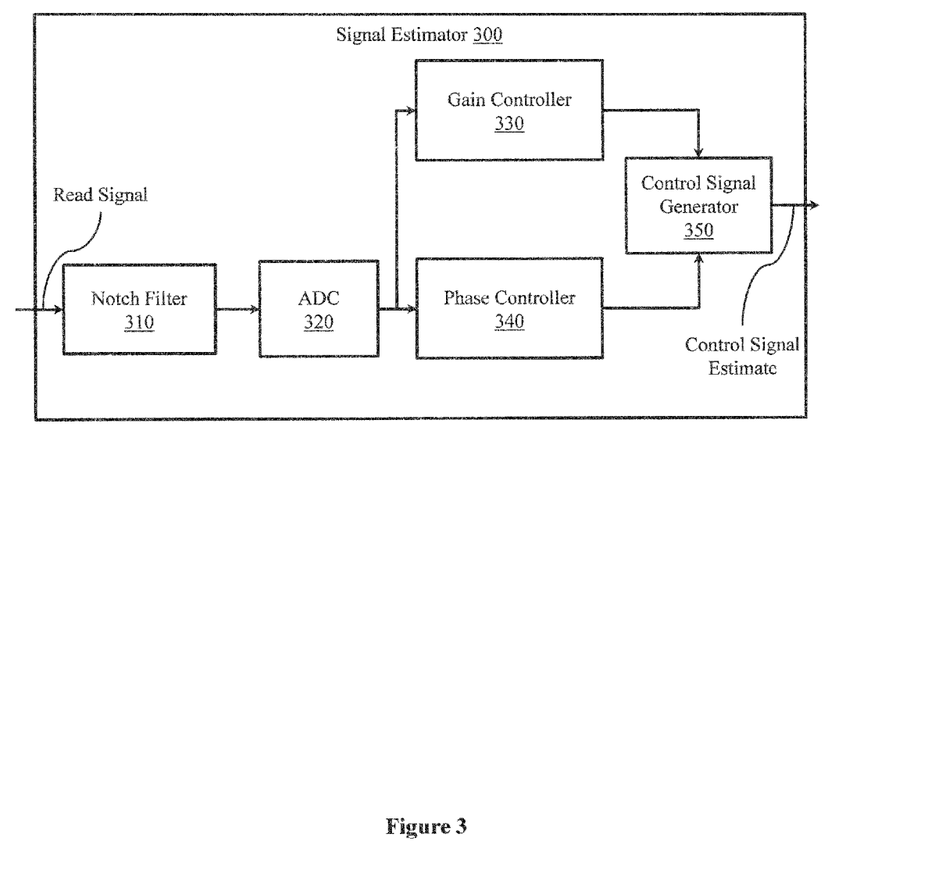
FIG. 3 illustrates one embodiment of a signal estimator associated with estimating a control signal.

Further aspects of estimating the control signal are discussed with respect to FIG. 3. FIG. 3 illustrates one embodiment of a signal estimator 300 associated with estimating a control signal. In FIG. 3, the signal estimator 300 includes a filter 310, an analog-to-digital converter (ADC) 320, a gain controller 330, a phase controller 340, and a control signal generator 350.

In one embodiment, the filter 310 is a band-pass filter or other filter that isolates a portion of the read signal. In the signal estimator 300, the filter 310 is the first component to receive the read signal. The filter 310 receives the read signal first in order to remove portions of the read signal that have a different frequency than the control signal. In this way, the filter 310 isolates a portion of the read signal where the control signal is embedded and permits other components (e.g., the gain controller 330 and the phase controller 340) to process the read signal without the presence of unwanted portions of the read signal. The filter 310 removes a majority of the data signal from the read signal which leaves a remainder of the read signal that includes the control signal and, possibly, some noise.

Accordingly, removing unwanted portions from the read signal permits the other components to more accurately and quickly determine values of the characteristics of the control signal. The components can more accurately and quickly determine the values since less noise is present after the filter 310 removes the unwanted portions of the read signal. The filter 310 can alternatively be implemented after the ADC 320 but before the gain controller 330 and the phase controller 340.

The ADC 320 converts the read signal, received from the filter 310, to a digital form. In one embodiment, the ADC 320 is configured to sample the read signal at a desired frequency (e.g., four samples per period). Once the ADC 320 samples and converts the read signal into a digital form, an output of the ADC 320 provides the read signal to the gain controller 330 and the phase controller 340.

The gain controller 330 is configured to determine an estimate of an amplitude of the control signal. For example, the gain controller 330 uses adjacent sample values (s(k) and s(k+1)) of the read signal to calculate the estimate of the amplitude (A). The gain controller 330 is configured to square each sample value, sum the squared values, and then take a square root of the sum to calculate the amplitude. The calculated amplitude is provided as an output to the control signal generator 350. Equation (3) illustrates the calculation performed by the gain controller 330.

$$A = \sqrt{s(k)^2 + s(k+1)^2} \tag{3}$$

In one embodiment, the gain controller 330 averages the estimate of the amplitude with previous estimates and provides the average to the control signal generator 350. For example, the gain controller 330 calculates a moving average of several estimated amplitudes and provides a value of the moving average to the control signal generator 350. In this way, the gain controller 330 accounts for short-term fluctuations in the amplitude and can highlight longer-term trends to reduce a possibility of errors.

Alternatively, in one embodiment, the gain controller 330 is configured to estimate the amplitude using an envelope detector and automatic gain control. The envelope detector provides a coarse estimate of the amplitude by tracking bounds of an amplitude of the read signal. The coarse estimate of the amplitude from the envelope detector is then refined using automatic gain control (AGC) to produce the estimate of the amplitude that is provided to the control signal generator 350.

The phase controller 340 is configured to determine an estimate of a phase of the control signal. For example, the phase controller 340 uses adjacent sample values (s(k) and s(k+1)) of the read signal to calculate the estimate of the phase ($\theta$). The phase controller 340 is configured to calculate the arctangent of adjacent values to estimate the phase. The estimate of the phase is provided as an output to the control signal generator 350. Equation (4) illustrates the calculation performed by the phase controller 340.

$$\theta = \arctan \frac{S(k+1)}{S(k)} \tag{4}$$

In one embodiment, the phase controller 340 averages the estimate of the phase with previous phase estimates and provides the average to the control signal generator 350. For example, the phase controller 340 calculates a moving average of several estimated phases and provides a value of the moving average to the control signal generator 350. In this way, the phase controller 340 accounts for fluctuations in the phase of the control signal and can reduce a possibility of errors.

Alternatively, in one embodiment, the phase controller 340 is configured to estimate the phase using a timing recovery function. The timing recovery function estimates the phase by converging a phase of the control signal with a known phase. The phase controller 340 provides the estimated phase to the control signal generator 350.

The control signal generator 350 receives the estimate of the amplitude from the gain controller 330 and the estimate of the phase from the phase controller 340. The control signal generator 350 is configured to calculate an estimate of the control signal using the estimate of the phase estimate and the estimate of the amplitude. The estimate of the control signal is a reconstructed form of the control signal that is provided to a cancellation unit (e.g., cancellation unit 220 of FIG. 2). The data signal can then be reproduced by cancelling the estimate of the control signal from the read signal.

Figure 4:
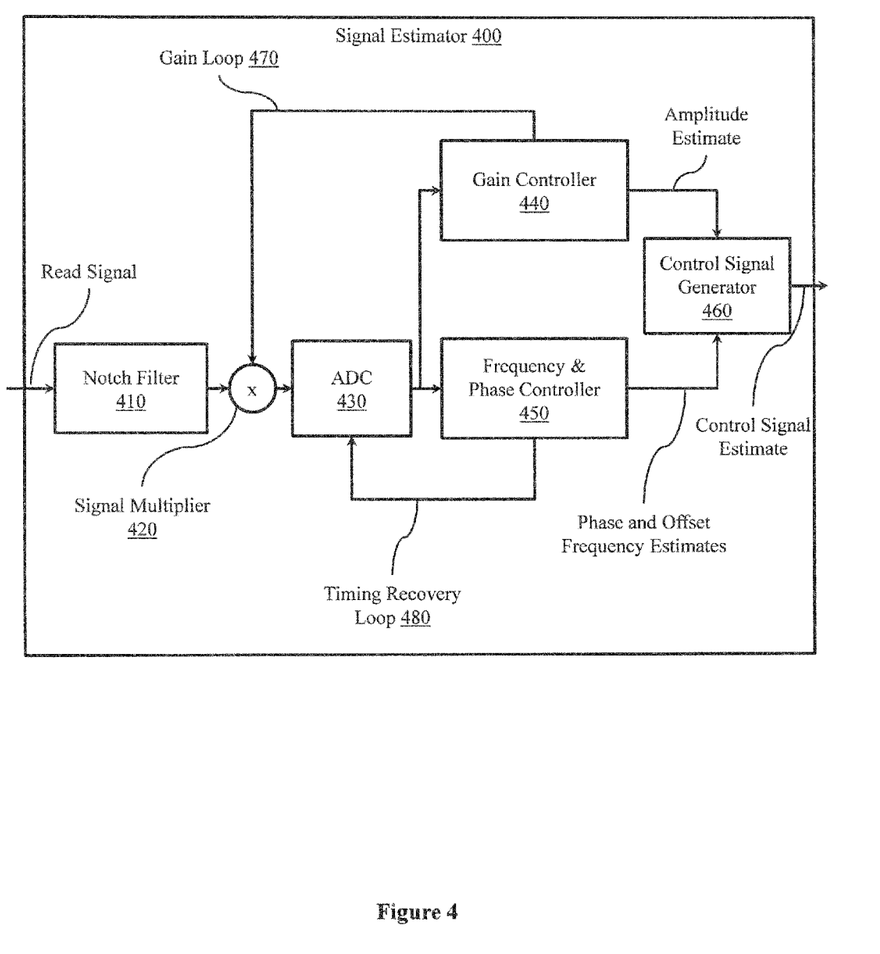
FIG. 4 illustrates one embodiment of a signal estimator associated with estimating a control signal.

Further aspects of estimating the control signal are discussed with respect to FIG. 4. FIG. 4 illustrates one embodiment of a signal estimator 400 associated with estimating a control signal from a read signal. In FIG. 3, the signal estimator 400 includes a filter 410, a signal multiplier 420, an analog-to-digital converter (ADC) 430, a gain controller 440, a phase controller 450, and a control signal generator 460. The signal estimator 400 includes components similar to components of the signal estimator 300 of FIG. 3. For example, the signal estimator 400 includes the same components as the signal estimator 300 except the signal estimator 400 includes the signal multiplier 420, which is not included in the signal estimator 300. Additionally, the signal estimator 400 includes a gain loop 470 and a timing recovery loop 480.

The signal estimator 400 is configured to account for an offset ($\Delta f_s$) from a nominal frequency ($f_s$) in the control signal. The offset ($\Delta f_s$) can occur in the control signal, for example, when a storage device uses different read and write frequencies. Accordingly, the gain loop 470 and the timing recovery loop 480 correct for the offset. Equation (5) illustrates an estimate of the control signal with the offset ($\Delta f_s$).

$$s(k) = A \sin(2\pi(f_s + \Delta f_s)kT + \theta) \tag{5}$$

In the signal estimator 400, the filter 410 is the first component to receive the read signal. The filter 410 is configured to remove portions of the read signal that have a different frequency than the control signal. The filter 410 provides remaining portions of the read signal to the signal multiplier 420.

The signal multiplier 420 is part of the gain loop 470. The gain loop 470 is configured to feedback an estimated amplitude from the gain controller 440 to the signal multiplier 420. The signal multiplier 420 multiplies an inverse of the estimated amplitude with the output of the filter 410. In this way, the signal multiplier 420 refines an estimate of the amplitude. An output of the signal multiplier 420 is provided to the ADC 430. In one embodiment, the multiplier 420 can be implemented using a variable gain amplifier.

The ADC 430 converts the read signal from a sinusoidal analog waveform into a digital format. The ADC 430 is configured to sample the read signal at a desired sampling frequency. The desired sampling frequency is, for example, twice the nominal frequency ($f_s$). Once sampled by the ADC 430, sampled values of the read signal are provided to the gain controller 440 and the frequency and phase controller 450. However, prior to providing the sampled values, the ADC 430 corrects the sampled values using an estimate of the phase ($\theta$) and the frequency offset ($\Delta f_s$) that are received as feedback from the frequency and phase controller 450 through the timing recovery loop 480. The timing recovery loop 480 is illustrated with a single connection between the ADC 430 and the frequency and phase controller 450. However, the timing recovery loop 480 can include individual connections for the estimate of the phase and for the offset.

The ADC 430 uses the estimate of the phase and the offset to correct the read signal for the offset. Once the read signal is corrected, sampled values of the read signal are provided by the ADC 430 to the gain controller 440 and the frequency and phase controller 450.

In one embodiment, the gain controller 440 is similar to the gain controller 330 of FIG. 3. For example, the gain controller 440 is configured to use adjacent sample values (s(k) and s(k+1)) of the read signal with equation (3) to calculate an estimate of the amplitude (A). Alternatively, in one embodiment, the gain controller 440 is configured to estimate the amplitude using an envelope detector. The envelope detector provides a coarse estimate of the amplitude by tracking bounds of an amplitude of the read signal. The coarse estimate of the amplitude is refined using automatic gain control (AGC). The AGC is implemented through the gain loop 470 to feedback the coarse estimate to refine the amplitude at the multiplier 420. The gain controller 440 provides the estimate of the amplitude to the control signal generator 460.

The control signal generator 460 also receives an input from the frequency and phase controller 450. In one embodiment, the frequency and phase controller 450 is similar to the phase controller 340 of FIG. 3. For example, the frequency and phase controller 440 is configured to use adjacent sample values (s(k) and s(k+1)) of the read signal with equation (4) to calculate the estimate of the phase ($\theta$). The frequency and phase controller 450 is also configured to determine a value of the offset.

Alternatively, in one embodiment, the frequency and phase controller 450 is configured to estimate the phase and the frequency offset using a timing recovery loop 480. A timing recovery function is implemented using feedback to the ADC 430 through the timing recovery loop 480. The frequency and phase controller 450 provides the estimate of the phase and the offset to the control signal generator 460 and through the timing recovery loop 480 to the ADC 430.

The control signal generator 460 is configured to reconstruct the control signal using the estimate of the amplitude, the estimate of the phase, and the offset. The signal estimator 400 produces the estimate of the control signal and provides the estimate of the control signal to a cancellation unit (e.g., cancellation unit 220 of FIG. 2) to cancel the control signal from the read signal.

Figure 5:
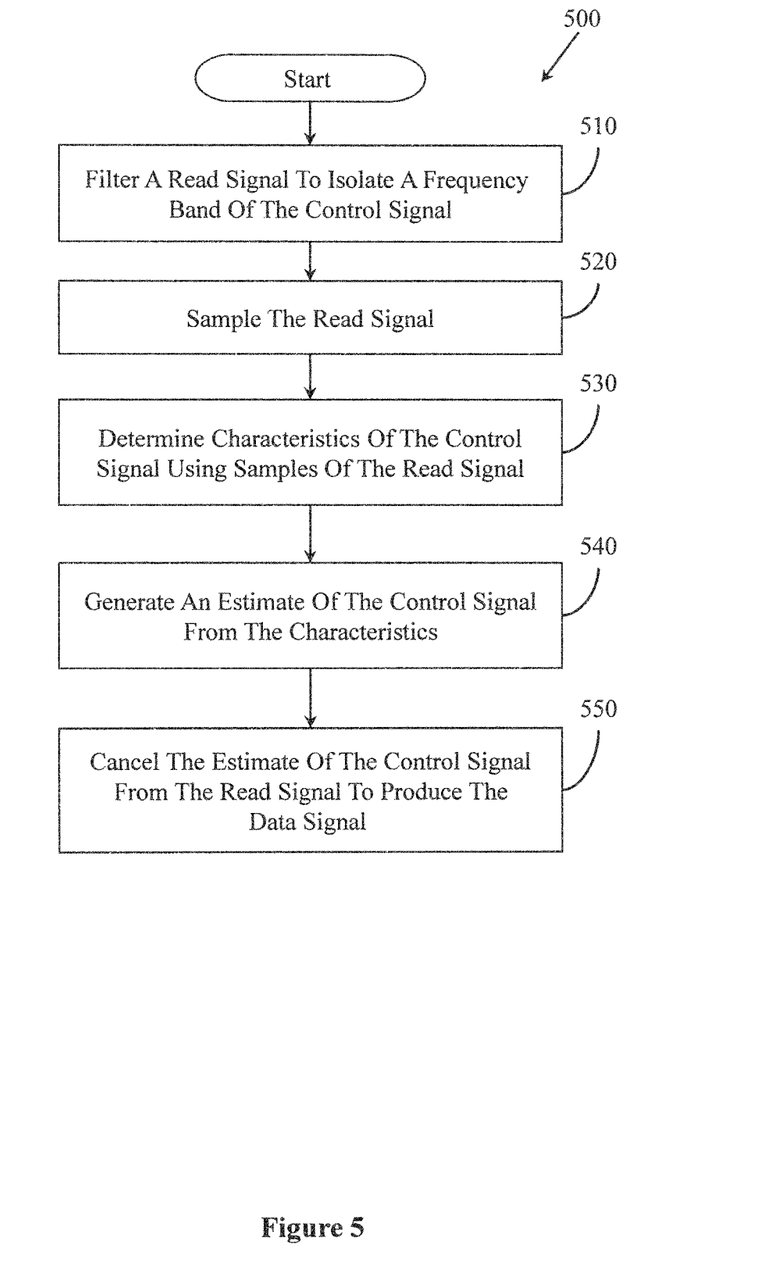
FIG. 5 illustrates one embodiment of a method associated with reproducing a data signal that is embedded with a control signal.

Further aspects of estimating the control signal are discussed with respect to FIG. 5. FIG. 5 illustrates one embodiment of a method 500 associated with reproducing a data signal that is embedded with a control signal. FIG. 5 will be discussed from the perspective of the detector 200 of FIG. 2.

At 510, the detector 200 filters the read signal. For example, a storage device that is reading a storage medium provides the read signal to the detector 200 as the read signal is generated. The detector 200 isolates a frequency band of the control signal from the read signal by filtering other frequencies from the read signal that are not consistent with the control signal. In this way, the detector 200 removes extraneous portions of the read signal that may interfere with later processing.

At 520, the detector 200 samples the read signal. The detector 200 samples the read signal by, for example, determining a current value (e.g. a voltage level) of the read signal. The detector 200 samples the read signal at a sampling frequency to provide a sufficient number of data points to accurately reproduce the control signal. In one example, the detector 200 samples the read signal at twice a fundamental frequency of the control signal.

At 530, the detector 200 determines characteristics of the control signal from the samples taken at 520. The characteristics include, for example, a phase ($\theta$) of the control signal and an amplitude (A) of the control signal. In one embodiment, at 530, the detector 200 determines a phase of the control signal by calculating an arc tangent of adjacent samples of the read signal as illustrated in equation (4). Additionally, at 530, the detector 200 determines an amplitude of the control signal by calculating a square of adjacent samples of the read signal. The detector 200 can determine the square of adjacent samples using equation (3).

In another embodiment, at 530, the detector 200 determines the amplitude by tracking an amplitude of the read signal to produce a coarse estimate of the amplitude. The detector 200 refines the coarse estimate of the amplitude to produce an estimate of the amplitude of the control signal by using a feedback loop (gain loop) to perform automatic gain control on the coarse estimate. As a result, the detector produces an estimate of the amplitude of the control signal.

Additionally, at 530, the detector 200 determines the phase by applying a timing recovery function to the read signal. In one embodiment, the timing recovery function is used to correct a frequency offset ($\Delta f_s$) that is present in the control signal. The timing recovery function is implemented with a timing recovery loop that provides a feedback of the frequency offset and the phase. Accordingly, using the timing recovery loop the detector 200 can correct for the offset and provide a more accurate estimate of the phase.

At 540, the detector 200 uses the characteristics determined at 530 to generate an estimate of the control signal. In one embodiment, the detector calculates the estimate of the control signal according to, for example, equation (2). In another embodiment, the detector 200 uses equation (5) to calculate an estimate of the control signal.

At 550, the detector 200 cancels the estimate of the control signal from the read signal to produce a data signal. The data signal can then be decoded by a data decoder to reproduce encoded data with a lower bit error rate (BER) than is achieved if the read signal where used as a direct input to a data decoder. Accordingly, the method 500 achieves better data recovery by cancelling the control signal from the read signal using an estimate of the control signal.

Figure 6:
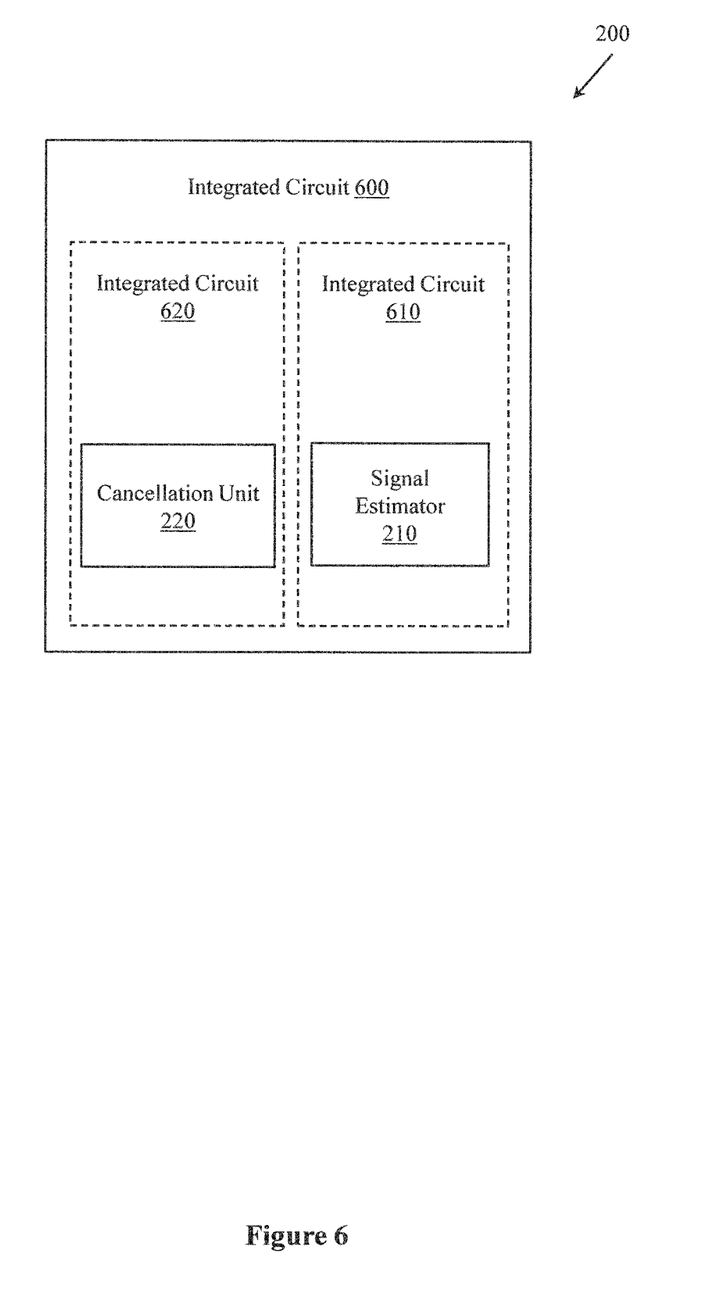
FIG. 6 illustrates one embodiment of an integrated circuit associated with reproducing a data signal that is embedded with a control signal.

FIG. 6 illustrates another embodiment of the detector 200 from FIG. 2 that is configured with separate integrated circuits and/or chips. In this embodiment, the signal estimator 210 from FIG. 2 is embodied as a separate integrated circuit 610. Additionally, the cancellation unit 220 is embodied on an individual integrated circuit 620. The circuits are connected via connection paths to communicate signals. While integrated circuits 610 and 620 are illustrated as separate integrated circuits, they may be integrated into a common circuit board 600. Additionally, integrated circuits 610 and 620 may be combined into fewer integrated circuits or divided into more integrated circuits than illustrated. In another embodiment, the signal estimator 210 and the cancellation unit 220 illustrated in integrated circuits 610 and 620 may be combined into a separate application specific integrated circuit. In other embodiments, the functionality associated with the signal estimator 220 may be embodied as firmware executable by a processor.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A detector for detecting a data signal embedded in a read signal from a storage device, wherein the read signal includes the data signal and a control signal, the detector comprising:
   a signal estimator configured to generate an estimate of the control signal from the read signal by sampling the read signal to determine characteristics of the control signal, wherein the signal estimator uses the characteristics to calculate the estimate of the control signal; and
   a cancellation unit configured to produce the data signal by cancelling the estimate of the control signal from the read signal, wherein the signal estimator is configured to sample the read signal at at least twice a fundamental frequency of the control signal, wherein the signal estimator is configured to determine the characteristics of the control signal by
      (i) determining a phase of the control signal by calculating an arc tangent of adjacent samples of the read signal, and
      (ii) determining an amplitude of the control signal by calculating a square of adjacent samples of the read signal.

2. The detector of claim 1, wherein the control signal is a continuous servo signal that is embedded with the data signal, and wherein the continuous servo signal guides the storage device when reading data from a storage medium of the storage device.

3. The detector of claim 1, wherein the characteristics of the control signal include a phase and an amplitude, and wherein the cancellation unit is configured to cancel the estimate of the control signal from the read signal by combining an inverse of the estimate of the control signal with the read signal.

4. The detector of claim 1, wherein the signal estimator is configured to remove the data signal from the read signal by using a filter and to use a remainder of the read signal to generate the estimate of the control signal.

5. The detector of claim 1, wherein the read signal is a sinusoidal waveform, and wherein the signal estimator includes a filter that isolates a frequency band of the control signal to remove noise from the data signal of the read signal when generating the estimate of the control signal.

6. The detector of claim 1, wherein the signal estimator is configured to average values of each of the characteristics using a moving average and to generate the estimate of the control signal using the average values of each of the characteristics.

7. A detector for detecting a data signal embedded in a read signal from a storage device, wherein the read signal includes the data signal and a control signal, the detector comprising:

a signal estimator configured to generate an estimate of the control signal from the read signal by sampling the read signal to determine characteristics of the control signal, wherein the signal estimator uses the characteristics to calculate the estimate of the control signal; and a cancellation unit configured to produce the data signal by cancelling the estimate of the control signal from the read signal, wherein the characteristics of the control signal include a phase and an amplitude, wherein the signal estimator is configured to determine the characteristics of the control signal by (i) tracking an amplitude of the read signal to produce a coarse estimate of the amplitude and processing the coarse estimate using automatic gain control to produce the amplitude of the control signal, and (ii) applying a timing recovery function to the read signal to determine the phase of the control signal.

8. A method for detecting a data signal embedded in a read signal of a storage device, wherein the read signal includes the data signal and a control signal, the method comprising:

generating, in a hardware detector configured to perform the method, an estimate of the control signal from the read signal by sampling the read signal to determine characteristics of the control signal, wherein generating the estimate includes calculating the estimate using the characteristics; and producing the data signal by cancelling the estimate of the control signal from the read signal, wherein determining the characteristics of the control signal includes (i) determining a phase of the control signal by calculating an arc tangent of adjacent samples of the read signal, and (ii) determining an amplitude of the control signal by calculating a square of adjacent samples of the read signal.

9. The method of claim 8, wherein the control signal is a continuous servo signal that is embedded with the data signal, wherein the continuous servo signal guides the storage device when reading data from a storage medium of the storage device.

10. The method of claim 8, wherein the characteristics of the control signal include a phase and an amplitude, and wherein cancelling the estimate of the control signal from the read signal includes subtracting the estimate of the control signal from the read signal.

11. The method of claim 8, further comprising:

filtering the read signal to isolate a frequency band of the control signal from the read signal, wherein filtering the read signal removes portions of the data signal from the read signal that have a different frequency than the control signal.

12. The method of claim 8, wherein the generating the estimate of the control signal includes using a filter to remove portions of the data signal from the read signal and using a remainder of the read signal to generate the estimate of the control signal.

13. The method of claim 8, wherein determining the characteristics of the control signal includes averaging values of each of the characteristics using a moving average.

14. A method for detecting a data signal embedded in a read signal of a storage device, wherein the read signal includes the data signal and a control signal, the method comprising:

generating, in a hardware detector configured to perform the method, an estimate of the control signal from the read signal by sampling the read signal to determine characteristics of the control signal, wherein generating the estimate includes calculating the estimate using the characteristics; and producing the data signal by cancelling the estimate of the control signal from the read signal, wherein the characteristics of the control signal include a phase and an amplitude, and wherein determining the characteristics of the control signal includes (i) tracking a read amplitude of the read signal to produce a coarse estimate of the amplitude of the control signal and processing the coarse estimate using an automatic gain control to produce the amplitude of the control signal, and (ii) applying a timing recovery function to the read signal to determine the phase of the control signal.

15. A data detector for detecting a data signal embedded in a read signal that is produced by a storage device, wherein the read signal includes the data signal and a servo signal, the data detector comprising:

a signal estimator configured to determine characteristics of the servo signal from the read signal and to generate an estimate of the servo signal using the characteristics; and a cancellation unit configured to output the data signal by applying the estimate of the servo signal to the read signal to cancel the servo signal from the read signal, wherein the signal estimator is configured to sample the read signal at, at least, twice a fundamental frequency of the servo signal, wherein the signal estimator is configured to determine the characteristics of the servo signal by (i) determining a phase of the servo signal by calculating an arc tangent of adjacent samples of the read signal, and (ii) determining an amplitude of the servo signal by calculating a square of adjacent samples of the read signal.

16. The device of claim 15, wherein the characteristics of the servo signal include a phase, a phase offset, and an amplitude, wherein the signal estimator includes an envelope detector that is configured to track an envelope of the read signal and to estimate the amplitude of the servo signal by processing the envelope through an automatic gain controller, and wherein the signal estimator is configured to determine the phase and the phase offset of the servo signal by applying a timing recovery function to the read signal.

17. The device of claim 15, wherein the storage device is a hard disk drive, and wherein the signal estimator includes a filter that isolates a frequency band of the servo signal to remove portions of the data signal from the read signal when generating the estimate of the servo signal.

* * * * *